United States Patent [19]

Arons et al.

[11] 4,410,607
[45] Oct. 18, 1983

[54] POROUS ELECTRODE PREPARATION METHOD

[75] Inventors: Richard M. Arons, Wheaton; Joseph Ill.

[73] Assignee: The United States of America as represented by the U.S. Department of Energy, Washington, D.C.

[21] Appl. No.: 303,325

[22] Filed: Sep. 17, 1981

[51] Int. Cl.$^3$ ............................................. H01M 4/86
[52] U.S. Cl. ...................................... 429/40; 429/42; 29/623; 75/213
[58] Field of Search ....................... 429/40, 42, 44, 45; 29/623, 623.1, 623.5; 75/200, 213

[56] References Cited

U.S. PATENT DOCUMENTS

| | | | |
|---|---|---|---|
| 2,928,891 | 3/1960 | Justi et al. | 429/45 |
| 3,282,737 | 11/1966 | Hintemann et al. | 429/42 X |
| 3,323,951 | 6/1967 | Kreiselmaier | 75/200 X |
| 3,367,801 | 2/1968 | Kreiselmaier | 429/45 |
| 3,423,247 | 1/1969 | Darland, Jr. et al. | 429/40 |
| 3,451,810 | 6/1969 | Smith | 429/40 X |
| 3,480,538 | 11/1969 | Sturm | 429/40 X |
| 3,981,749 | 9/1976 | Fukuda et al. | 429/45 X |

Primary Examiner—Anthony Skapars
Attorney, Agent, or Firm—Hugh W. Glenn; Robert J. Fisher; Richard G. Besha

[57] ABSTRACT

A porous sintered plaque is provided with a bimodal porosity that is especially well suited for use as an electrode within a molten carbonate fuel cell. The coarse porosity is sufficient for admitting gases into contact with the reaction surfaces while the fine porosity is wetted with and retains molten electrolyte on the reaction sites. The electrode structure is prepared by providing a very fine powder of such as nickel oxide and blending the powder with a suitable decomposable binder to form a solid mass. The mass is comminuted into agglomerate size particles substantially larger than the fine oxide particles and formed into a cohesive compact for subsequent sintering. Sintering is carried out at sufficient conditions to bind the agglomerates together into a porous structure having both coarse and fine porosity. Where lithiated nickel oxide cathodes are prepared, the sintering conditions can be moderate enough to retain substantial quantities of lithium within the electrode for adequate conductivity.

16 Claims, 2 Drawing Figures

POROUS ELECTRODE PREPARATION METHOD

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

The present invention relates to methods of preparing porous plaques for use as electrodes in a variety of applications. One principal use is for the preparation of porous cathodes to be employed in a molten carbonate fuel cell. A plaque of the type described herein may also have application as a target within an apparatus for production and recovery of tritium produced in the neutron bombardment of lithium compounds. Various other applications may occur in which a gas is reacted or generated within a porous substrate.

Molten carbonate fuel cells typically operate at high temperatures of about 900-1000 K. to convert chemical energy to D.C. electricity. Fuels such as $H_2$, $CO$ or methanol react with oxidant gases, for instance, air or oxygen including carbon dioxide during this production of electrical energy. Typical reactions are as follows:

| | |
|---|---|
| at the anode | $H_2 + CO_3^{--}$ yields $CO_2 + H_2O + 2e^-$ |
| | $CO + CO_3^{--}$ yields $2CO_2 + 2e^-$ |
| at the cathode | $2e^- + CO_2 + \frac{1}{2} O_2$ yields $CO_3^{--}$ |

It is contemplated that these fuel cells will typically operate in stacks of repeating elements. Each element contains an anode, a cathode and an electrolyte structure separating the two electrodes. In the molten carbonate cell, anode structures typically include porous sintered nickel, for instance, alloyed with chromium or cobalt for strength. The electrolyte structure, for instance, can be a porous tile of lithium aluminate filled with a molten carbonate electrolyte. The electrolyte tile should include an appropriate pore structure to permit wetting without flooding of the adjacent electrode with the electrolyte. Typical electrolyte tiles and molten carbonate salt electrolytes are presented in U.S. Pat. No. 4,115,632 to Kinoshita et al and in U.S. Pat. No. 4,251,600 to Sim et al.

Early efforts in providing cathodes for molten carbonate fuel cells have involved assembling the cell with a porous nickel plaque as the cathode. On raising the cell to operating temperature and exposing the plaque to oxygen and molten carbonate salt, the nickel cathode plate oxidizes in situ to NiO and incorporates a small percentage e.g. 2-3% of lithium. Nickel oxide (NiO) is a deficient semiconductor (P-type) that exhibits rather poor electrical conductivity. The incorporation of lithium ions within the structure has been found to provide an enormous enhancement in the P-type conductivity. However, substantial difficulties have arisen in the preparation of nickel oxide cathodes with in situ oxidation and lithiation of the sintered nickel plaque. For example, substantial cathode swelling with accompanying lithium loss from the electrolyte has made it desirable to provide alternate approaches to the preparation of porous cathodes for the molten carbonate fuel cells.

SUMMARY OF THE INVENTION

In view of the above, it is an object of the present invention to provide a method of preparing a porous plaque of oxide material having a bimodal porosity.

It also is an object to provide a method of preparing a porous sintered lithiated nickel oxide plaque ready for assembling within a fuel cell employing a molten carbonate electrolyte.

It is a further object to provide a porous nickel oxide electrode for use as a cathode within a molten carbonate fuel cell in which the cathode includes a bimodal porosity characterized by a first pore size sufficiently small to retain molten carbonate in contact with nickel oxide surfaces and a second pore size sufficiently large to permit oxidant and gas flow into the electrode for contact with the electrolyte wetted surfaces.

It is a further object of the present invention to provide a method of preparing a porous nickel oxide electrode containing a small portion of lithium ions to enhance electrical conductivity in which the porous electrode includes a structural porosity between agglomerate particles and a microstructure of porosity within the agglomerates between much finer nickel oxide particles.

In accordance with the present invention, a method is presented for preparing a sintered oxide plaque having a bimodal porosity for use as a substrate with sufficiently large pores for admitting gas flow and sufficiently small pores for providing high surface area. The method comprises providing a finely divided particulate oxide material which is blended with a binder to form a solid mass. The mass is comminuted into agglomerates of particle size substantially larger than that of the finely divided oxide material. The agglomerates are formed into a porous cohesive plaque and the plaque sintered to obtain a structure characterized by bimodal porosity.

In more specific aspects of the invention, the method is used to form finely divided nickel oxide into a porous sintered plaque for use as an electrode within a molten carbonate fuel cell. The bimodal porosity in the plaque is characterized by sufficiently large pores among agglomerate particles to permit admission of oxidant gases and sufficiently small pore sizes within the agglomerate particles to retain molten carbonate salt in wetting contact with the microstructure of the agglomerates.

One other specific aspect is the sintering of the cohesive plaque at a preferred temperature of about 1000°-1100° C. for about one hour to provide structural stability without excessive loss of lithium from the structure.

In another aspect, the porosity of the porous sintered plaque is characterized by pore sizes of about 0.05 to about 0.2 micrometers in about 10-30% of the pore volume with pore sizes of about 2-20 micrometers in about 25-75% of the pore volume.

The present invention further contemplates an electrode for a molten carbonate fuel cell wherein the electrode comprises a porous sintered plaque of nickel oxide having a total porosity of about 40-70% with a bimodal pore size distribution characterized by about 10-30% of the pore volume in the range of 0.05 to 0.2 micrometers and about 25-75% of the pore volume having a pore size in the range of 2-20 micrometers.

DETAILED DESCRIPTION OF THE PREFERRED EMBODIMENT

Figure 1:
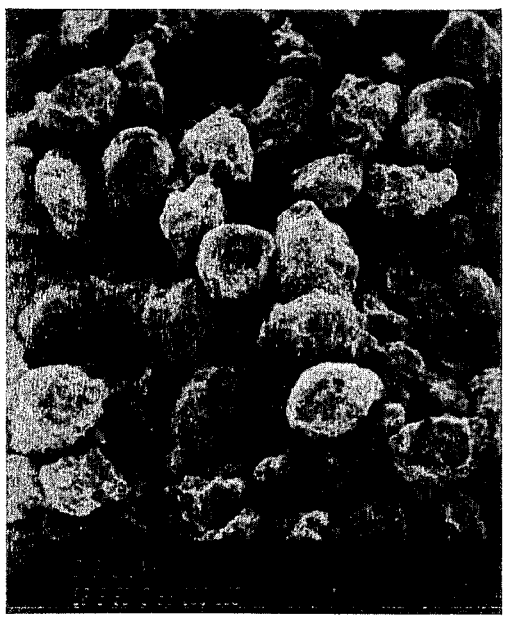
FIG. 1 is a photomicrograph at 200X of a portion of a porous sintered nickel oxide structure illustrating interagglomerate porosity.

In one manner of preparing the electrode structure of the present invention, a fine powder of nickel oxide with a minor fraction of lithium carbonate is blended with a resinous binder. The binder is allowed to set and the resulting mass is comminuted by conventional means into agglomerates of substantially larger size than the fine particles of oxide material. Agglomerates can then be classified to obtain a desired size fraction and then pressed or otherwise formed into a cohesive porous plaque. The plaque is then sintered at a selected temperature for sufficient time to provide an integral porous structure having a bimodal porosity. The structure will include fine pores among the fine particles of oxide material and a coarse porosity among the agglomerate particles. The fine pores within the agglomerates provide surface area wetted by electrolyte for electrochemical reactions within a fuel cell. The larger pores among the agglomerates provide channels for passage of reactant gases to the reaction sites. In other applications such as where the plaque is used for tritium gas production, the gas generated in the fine porosity is swept out in a flow of purge gas passing through the passageways provided by the large pores.

The particle size of the original oxide material is of importance as it relates to the fine pore size within the finished plaque. Nickel oxide particles in the range of 0.5 to 1 micrometer average diameter can be blended with similar size particles of lithium oxide or lithium carbonate in preparing the fuel cell electrode. Lithium is provided at a level of about 3-6 parts lithium per 100 parts of nickel. This is somewhat in excess of that required in the final electrode as some lithium may be lost in the sintering operation.

Prior to adding the lithium and the binder, the nickel oxide powder can be mildly calcinated to reduce its sinterability and shrinkage during the subsequent sintering step. Calcining at about 700°–1000° C. for about one hour has been shown to substantially reduce the shrinkage during the subsequent sintering step while permitting formation of the desired bimodal pore structure. However, calcining at 1000° C. for six hours has been shown to be excessive in that the agglomerate structure is not maintained within the final sintered plaque.

The agglomerates are initially formed through use of a binder. The binder is selected from well known resinous and carbon bonding materials that will decompose at the sintering conditions and be driven as gases from the final electrode structure. Binders such as polyvinyl alcohol, or mixtures of stearic acid and acrylic ester polymers have been found to be suitable. One appropriate source of acrylic ester polymers is the commercial product Acryloid available from Rohm and Hass. Commercial stearic acid mixtures containing approximately 45% palmitic acid, 50% stearic acid and 5% oleic acid may also be suitable for use.

The binder is employed within a suitable solvent. Polyvinyl alcohol is water soluble and may be used in aqueous solution. Carbon tetrachloride or another suitable organic solvent can be employed for stearic acid-acrylic ester mixtures. The solvent conveys the binder throughout and into adherent contact with the particles of the powdered mixtures.

The above binders are presented by way of example. It will be clear that various other known resinous binders can be used in accordance with the method and electrode of this invention.

The solid mass formed on setting of the binder is comminuted into particles of substantially larger size than that of the original oxide powder. These agglomerates may be classified to select the appropriate size or fraction for forming the network of coarse porosity within the sintered electrode. Ordinarily the agglomerates will be between 20 and 70 micrometers average diameter and preferably about 30–50 micrometers average diameter.

A plaque is formed by pressing or otherwise forming the agglomerates into the desired disk or plate-like shape of the electrode structure. This can be conveniently performed by pressing the agglomerates together at about 7 MPa to 14 MPa.

The porous plaque held together by the compaction and cohesion between the agglomerate particles is then sintered under preselected conditions. It is desired to provide sufficient sintering to bind portions of the fine particles together within the agglomerates but to avoid collapse of the coarse porosity among the agglomerates on release of the decomposable bbinder. It is also preferred that the sintering conditions be selected to retain sufficient lithium within the final sinter for adequate conductivity within the electrode structure. It has been found that sintering temperatures within the range of 1000°–1200° C., preferably 1000°–1100° C. can be imposed for about 1 hour while retaining substantial portions of the lithium concentration. However, sintering at 1300° C. for 1 hour is excessive and drives off most of the lithium. Table I below shows the results of sintering at various temperatures for a 1 hour soak of porous nickel oxide compacts formed from the above described agglomerates.

TABLE I

Lithiated NiO after Sintering for 1 Hour
(Originally Compounded with 5 cation % $Li^+$)

| Sintering Temp. (°C.) | Density g/cc | Resistivity (ohm-cm) | Cation Percent $Li^+$ |
|---|---|---|---|
| 800 | 2.997 | 3.65 | 4.38 |
| 900 | 3.382 | 2.80 | 3.25 |
| 1000 | 3.907 | 2.35 | 2.69 |
| 1100 | 4.319 | 2.34 | 2.69 |
| 1200 | 4.376 | 4.58 | 1.735 |
| 1300 | 5.338 | 22.9 | 0 |

A number of other porous sintered nickel oxide structures including 5 cation percent Li were prepared with bimodal porosity essentially in the manner described above by sintering at 1000° C. for one hour. Various modifications were made in the amounts and types of material as well as particle sizes to determine their effects. In addition, both calcined and virgin powders were employed in preparing the agglomerates. Table II given below summarizes the process conditions and characteristics of the resulting porous plaques.

TABLE II

| Run No. | Agglomerate Mesh Size | Calcination Conditions | Binder Type and Quantity | % of Theoretical Density | % Shrinkage on Firing |
|---|---|---|---|---|---|
| 1 | −200 +270 | Virgin | 16% SA[a] | 42.5 | 13.8 |
| 2 | −270 +325 | Virgin | 16% SA | 46.9 | 15.7 |
| 3 | −200 +270 | 1000° C., 1h | 5% PVA[b] | 37.6 | 2.2 |
| 4 | −270 +325 | 1000° C., 1h | 5% PVA | 37.1 | 1.9 |
| 5 | −200 +270 | Virgin | 5% PVA | 39.7 | 10.9 |
| 6 | −270 +325 | Virgin | 5% PVA | 40.4 | 11.1 |
| 7 | −200 +270 | Virgin | 2½% PVA | 46.2 | 11.4 |
| 8 | −270 +325 | Virgin | 2½% PVA | 48.4 | 11.8 |
| 9 | −200 +325 | 1000° C., 6H | 16% SA | 39.5 | 8.2 |
| 10 | −200 +270 | Virgin | 5% PVA | 44.9 | 11.7 |
| 11 | −270 +325 | Virgin | 5% PVA | 45.1 | 12.1 |

[a] SA denotes 33% stearic acid with 67% Acryloid.
[b] PVA denotes polyvinyl alcohol.

On examining the resulting sinters of Table II, run numbers 1 and 2 showed good pore structure with some agglomerate formation. Run numbers 3 and 4 had good pore structure with excellent agglomerate retention. Runs 5 to 7 had marginally worse pore retention than with calcination while run 7 also showed some additional dusting. Run 8 had agglomerate collapse at the pressed surface and run 9 had extensive agglomerate collapse throughout. Runs 10 and 11 were not characterized.

From the porous sintered oxide plaques provided in the operations illustrated in Table II, it was seen that sintering at 1000° C. for one hour is sufficient to provide good structural integrity with a bimodal pore structure. The calcining step prior to forming the agglomerates provides a substantial reduction in the shrinkage of the final sinter. Changes in particle size seem to have little effect on the final sinter structure as long as particles within the range of −200 to +325 US Sieve series were employed.

Figure 2:
FIG. 2 is a photomicrograph at 1000X showing porosity within individual agglomerate particles.

Referring to FIGS. 1 and 2 the bimodal pore structure is illustrated. FIG. 1 is a photomicrograph showing sintered agglomerates within the final sintered structure establishing a coarse pore structure with pore sizes of about 10-30 micrometers. Agglomerate particles of about 30-50 micrometers average diameter are illustrated and are preferred in providing this coarse porosity.

FIG. 2 is a photomicrograph of even larger (1000X) magnification and illustrates the very fine oxide of nickel and lithium particles that form the substantially larger agglomerates. The fine particles of about 0.5-1 micrometer in average diameter are illustrated as preferred in establishing this fine pore size of about 0.05-0.2 micrometers.

Although the present invention has been described in terms of specific materials and process steps, it will be clear to one skilled in the art that various changes and modifications can be made in accordance with the teaching of the specification within the scope of the invention as defined in the accompanying claims.

The embodiments of this invention in which an exclusive property or privilege is claimed are defined as follows:

1. A method of preparing a sintered oxide plaque having bimodal porosity for use as a substrate having large pores for a gas flow and small pores for providing a large surface area comprising:
   providing particulate oxide material of a first particle size;
   blending said particulate material with a decomposable, resinous binder to form a solid mass;
   comminuting the solid mass into agglomerates of a second particle size larger than said first particle size;
   compacting said agglomerates into a porous cohesive plaque having a coarse porosity among said agglomerates; and
   sintering said compacted plaque at a sufficient temperature for a sufficient time to sinter bind the particles of first size into a structure of fine porosity within said agglomerates while driving off said decomposable resinous binder but substantially maintaining said course porosity among said agglomerates.

2. The method of claim 1 wherein said particulate material includes an oxide of nickel and said sintered plaque is for use as an electrode in a fuel cell employing molten carbonate electrolyte and a reactant gas, said bimodal porosity includes a first pore size sufficiently small to wettingly retain said molten carbonate and a second pore size sufficiently large to permit passage of the reactant.

3. The method of claim 2 wherein said particulate oxide of nickel is blended with a resinous binder selected from the group consisting of polyvinyl alcohol in aqueous solution and a mixture of stearic acid and acrylic ester polymers in organic solution.

4. The method of claim 2 wherein prior to blending with said binder, said particulate oxide of nickel is calcined at about 1000° C. for about one hour.

5. The method of claim 4 wherein said cohesive plaque is sintered at about 1000° C. to 1200° C. for about one hour.

6. The method of claim 5 wherein said cohesive plaque is sintered at about 1000°-1100° C. for about one hour.

7. The method of claim 2 wherein said particulate oxide of nickel has particle sizes of about 0.5 to 1 $\mu$m and said agglomerates are of about 30-50 $\mu$m size.

8. The method of claim 7 wherein about 10-30% of the void volume of said sinter and plaque has a first pore size of about 0.05 to 0.2 $\mu$m and about 25-75% of the void volume has a second pore size of about 2-20 $\mu$m.

9. The method of claim 2 wherein said agglomerates are pressed at about 7 to 14 KPa to form a porous cohesive plaque.

10. The method of claim 2 wherein a minor proportion of lithium as oxide or carbonate is incorporated into said oxide of nickel material.

11. The method of claim 10 wherein about 3-6 parts lithium are included per 100 parts of nickel in said sintered plaque.

12. An electrode prepared by the method of claim 1 for a fuel cell including molten carbonate salt as electrolyte, said electrode comprising a porous sintered plaque of NiO having a porosity of about 40–70% with a bimodal pore size, said bimodal pore size characterized by about 10–30% of the pore volume having a fine pore size in the range of 0.05 to 0.2 μm and about 25–75% of the pore volume having a coarse pore size in the range of 2–20 μm.

13. A method of preparing a sintered oxide plaque of bimodal porosity comprising:

forming a particulate mixture of a first particle size including a major proportion of nickel oxide and a minor proportion of lithium oxide;

blending a decomposable resinous binder into said particulate mixture to form a solid mass;

comminuting the solid mass into agglomerates of a second particle size larger than said first particle size;

compacting said agglomerates to form a plaque having a coarse porosity among said agglomerates and a fine porosity within individual agglomerates; and heating said plaque to a sufficient sintering temperature for a sufficient time to drive off said resinous binder and to sinter bind said particles of first size while substantially maintaining said coarse porosity among said agglomerates and while substantially maintaining said minor proportion of lithium oxide within said plaque.

14. The method of claim 13 wherein said particulate mixture is formed by calcining nickel oxide particles at a temperature of 700°–1000° C. for about 1 hour but less than 6 hours followed by blending a minor proportion of particulate lithium as particulate oxide or carbonate with the nickel oxide particles.

15. The method of claim 14 wherein lithium is blended into the nickel oxide at about 3–6 parts lithium per 100 parts nickel.

16. The method of claim 15 wherein said plaque is heated to a sintering temperature of about 1000° C. to 1200° C. for about 1 hour.

* * * * *

UNITED STATES PATENT AND TRADEMARK OFFICE
CERTIFICATE OF CORRECTION

PATENT NO. : 4,410,607

DATED : October 18, 1983

INVENTOR(S) : Richard M. Arons, Joseph T. Dusek

It is certified that error appears in the above-identified patent and that said Letters Patent is hereby corrected as shown below:

Front Page, left column, the line identifying the inventors should read:

-- [75] Inventors: Richard M. Arons, Wheaton; Joseph T. Dusek, Downers Grove, both in Ill. --

Signed and Sealed this

Twelfth Day of June 1984

[SEAL]

*Attest:*

GERALD J. MOSSINGHOFF

*Attesting Officer*     *Commissioner of Patents and Trademarks*